(12) United States Patent
Lesartre et al.

(10) Patent No.: US 10,922,178 B2
(45) Date of Patent: Feb. 16, 2021

(54) MASTERLESS RAID FOR BYTE-ADDRESSABLE NON-VOLATILE MEMORY

(71) Applicant: Hewlett Packard Enterprise Development LP, Houston, TX (US)

(72) Inventors: Gregg B. Lesartre, Fort Collins, CO (US); Russ W. Herrell, Fort Collins, CO (US); Chris Michael Brueggen, Allen, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 115 days.

(21) Appl. No.: 16/176,731

(22) Filed: Oct. 31, 2018

(65) Prior Publication Data
US 2020/0133777 A1 Apr. 30, 2020

(51) Int. Cl.
*G06F 11/10* (2006.01)
*G06F 12/02* (2006.01)
*G06F 3/06* (2006.01)

(52) U.S. Cl.
CPC ........ *G06F 11/1092* (2013.01); *G06F 3/0613* (2013.01); *G06F 3/0656* (2013.01); *G06F 3/0679* (2013.01); *G06F 12/0246* (2013.01)

(58) Field of Classification Search
CPC .. G06F 11/1092; G06F 3/0613; G06F 3/0656; G06F 3/0679; G06F 12/0246
See application file for complete search history.

(56) References Cited

U.S. PATENT DOCUMENTS

| | | | |
|---|---|---|---|
| 7,457,928 B2 | 11/2008 | Evanchik | |
| 7,827,439 B2 | 11/2010 | Mathew | |
| 7,917,658 B2* | 3/2011 | Pettey | H04L 12/4633 710/2 |
| 9,372,752 B2 | 6/2016 | Das Sharma | |
| 10,409,511 B1* | 9/2019 | Subbarao | G06F 15/17331 |
| 2009/0240873 A1* | 9/2009 | Yu | G06F 3/0608 711/103 |
| 2013/0297894 A1* | 11/2013 | Cohen | G06F 3/0679 711/154 |

(Continued)

FOREIGN PATENT DOCUMENTS

KR 10-2013-0118876 A 10/2013

OTHER PUBLICATIONS

"Gen-Z Technology: Enabling Memory Centric Architecture", GenZ Consortium 2017, genzconsortium.org, 22 pp.

(Continued)

*Primary Examiner* — Kamini B Patel
*Assistant Examiner* — Indranil Chowdhury
(74) *Attorney, Agent, or Firm* — Sheppard Mullin Richter & Hampton LLP

(57) ABSTRACT

A system includes byte-addressable non-volatile memory (NVM) modules. The system includes media controllers communicatively connected to one another over a memory semantic fabric. Each media controller is responsible for a corresponding NVM module to which the media controller is attached. The media controllers cooperatively provide redundant array of independent disks (RAID) functionality at a granularity at which the NVM modules are byte-addressable without employing a master RAID controller.

20 Claims, 10 Drawing Sheets

(56) References Cited

U.S. PATENT DOCUMENTS

| | | | | |
|---|---|---|---|---|
| 2013/0297986 | A1* | 11/2013 | Cohen | G06F 3/0676 714/763 |
| 2014/0082261 | A1* | 3/2014 | Cohen | G06F 3/0688 711/103 |
| 2014/0108703 | A1* | 4/2014 | Cohen | G06F 3/0616 711/103 |
| 2014/0189421 | A1* | 7/2014 | Werner | G06F 3/0688 714/6.21 |
| 2014/0208004 | A1* | 7/2014 | Cohen | G06F 12/0246 711/103 |
| 2014/0208007 | A1* | 7/2014 | Cohen | G06F 3/0619 711/103 |
| 2014/0208062 | A1* | 7/2014 | Cohen | G06F 3/0688 711/206 |
| 2016/0077746 | A1 | 3/2016 | Muth et al. | |
| 2017/0242745 | A1 | 8/2017 | Sherlock | |
| 2017/0315731 | A1 | 11/2017 | Driever et al. | |
| 2018/0011764 | A1 | 1/2018 | Akutsu et al. | |
| 2018/0091172 | A1 | 3/2018 | Ilani et al. | |
| 2018/0173442 | A1* | 6/2018 | Kirkpatrick | G06F 3/0683 |
| 2019/0073265 | A1* | 3/2019 | Brennan | G06F 3/061 |
| 2020/0004445 | A1* | 1/2020 | Benisty | G06F 3/061 |
| 2020/0218678 | A1* | 7/2020 | Prabhakar | G06F 13/385 |

OTHER PUBLICATIONS

"Memory Mirror and Memory Patrol for Improved System Reliability," Retrieved from Internet May 25, 2018, <http://www.fujitsu.com/global/products/computing/servers/unix/spare-enterprise/technology/availability/memory.html>.

Arthur Sainio, "Smart Modular Announces Its Gen-z NVRAM Media Controller Demonstration Card," 2016, <http://www.smartm.com/media/press_releases/article422.asp>.

Casey, Greg, "Gen-Z: An Overview and Use Cases", OpenFabrics Aikance, 13th Annual Workshop 2017, DellEMC, Mar. 2017, 26 pp.

Condit, J. et al., "Better I/O Through Byte-Addressabie, Persistent Memory", SOSP '09, Oct. 11, 2009, Big Sky, Montana, 14 pp.

Douglas, C., "Local and Remote byte-addressable NVDIMM: High-level Use Cases", Intel Corporation, Sep. 11, 2015, 10 pp.

Gen-Z Overview, Jul. 2017, 27 pp., genzconsortium.org.

Keeton, K. et al., "Persistent memory: new tier or storage replacement?", SNIA Storage Developer Conference, Hewlett Packard Labs, Sep. 2017, 43 pp.

Timothy Prickett Morgan, "Future Interconnects: Gen-z Stitches a Memory Fabric," Sep. 5, 2017, <http://www.nextplatform.com/2017/09/05/future-interconnects-gen-z-stitches-memory-fabric/>.

Rudoff, A., "Persistent Memory Programming", login Summery 2017, vol. 42, No. 2, www.usenix.org, 7 pp.

Search Report and Written Opinion received for PCT Application No. PCT/US19/59175, dated Feb. 21, 2020, 14 pages.

* cited by examiner

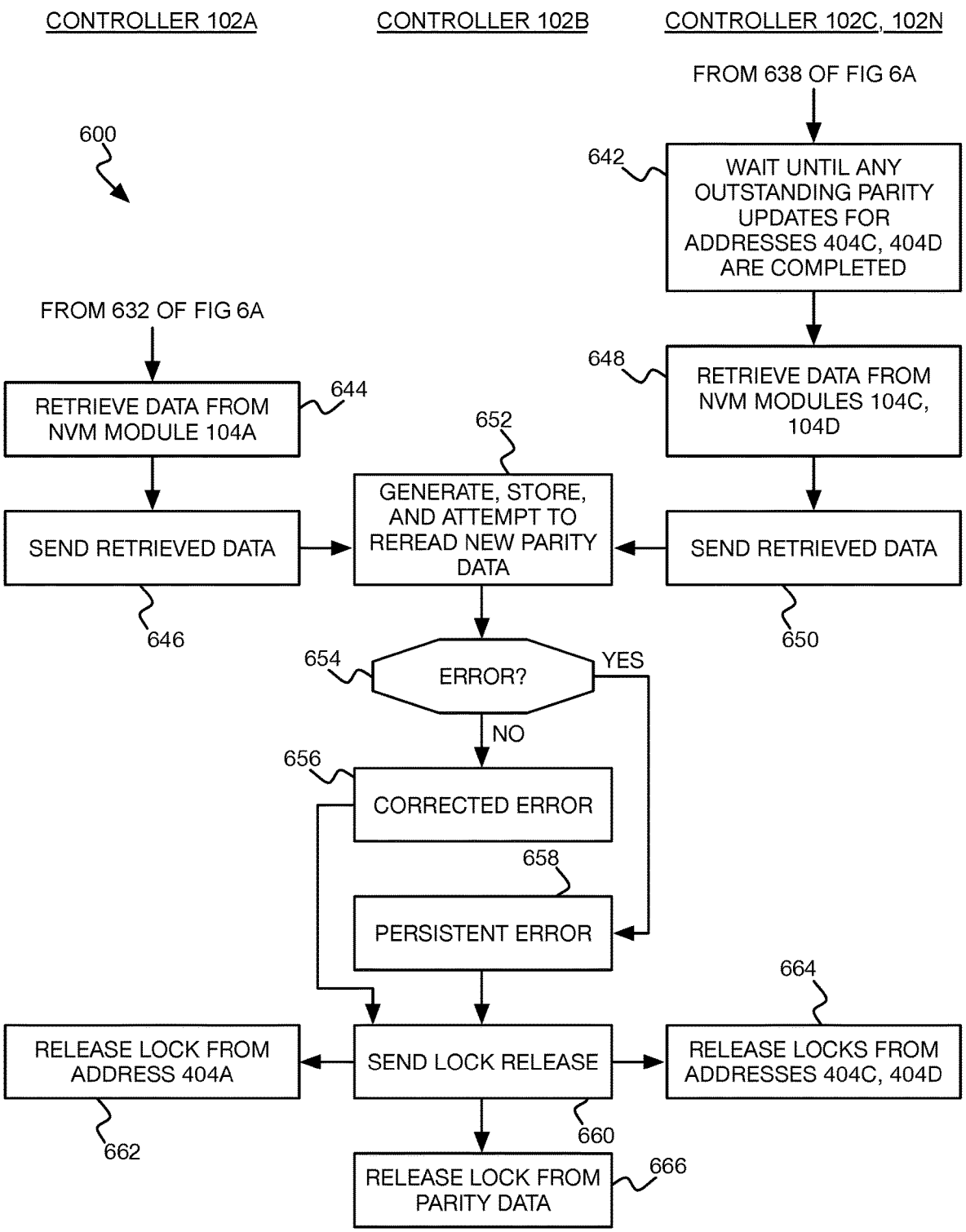

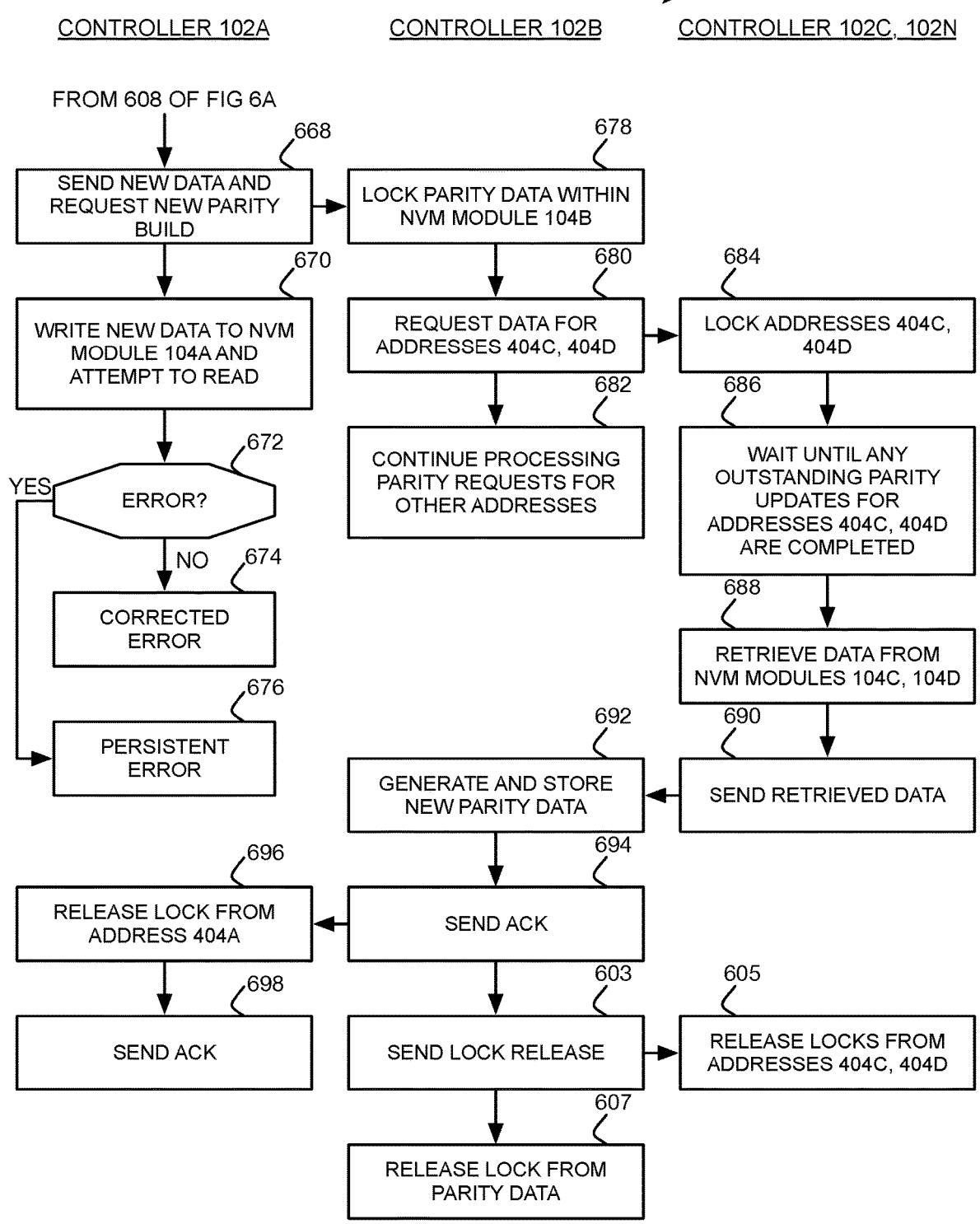

MASTERLESS RAID FOR BYTE-ADDRESSABLE NON-VOLATILE MEMORY

STATEMENT OF GOVERNMENT RIGHTS

This invention was made with Government support under Contract Number H98230-15-D-0022/0003 awarded by the Maryland Procurement Office. The Government has certain rights in this invention.

BACKGROUND

A computing system's storage has historically had characteristics different than its main memory. Storage includes physical devices such as hard disk drives, which provide relatively large amounts of persistent capacity that was accessible at relatively slow throughput. By comparison, main memory includes physical devices such as dynamic random-access memory (DRAM), which provides relatively small amounts of non-persistent capacity that was accessible at relatively fast throughput. The design of modern computing systems has to great degree been driven by these differing characteristics.

BRIEF DESCRIPTION OF THE DRAWINGS

FIGS. 6A, 6B, and 6C are flowcharts of an example method for performing a write request within the SCM system of FIG. 1.

DETAILED DESCRIPTION

Figure 1:
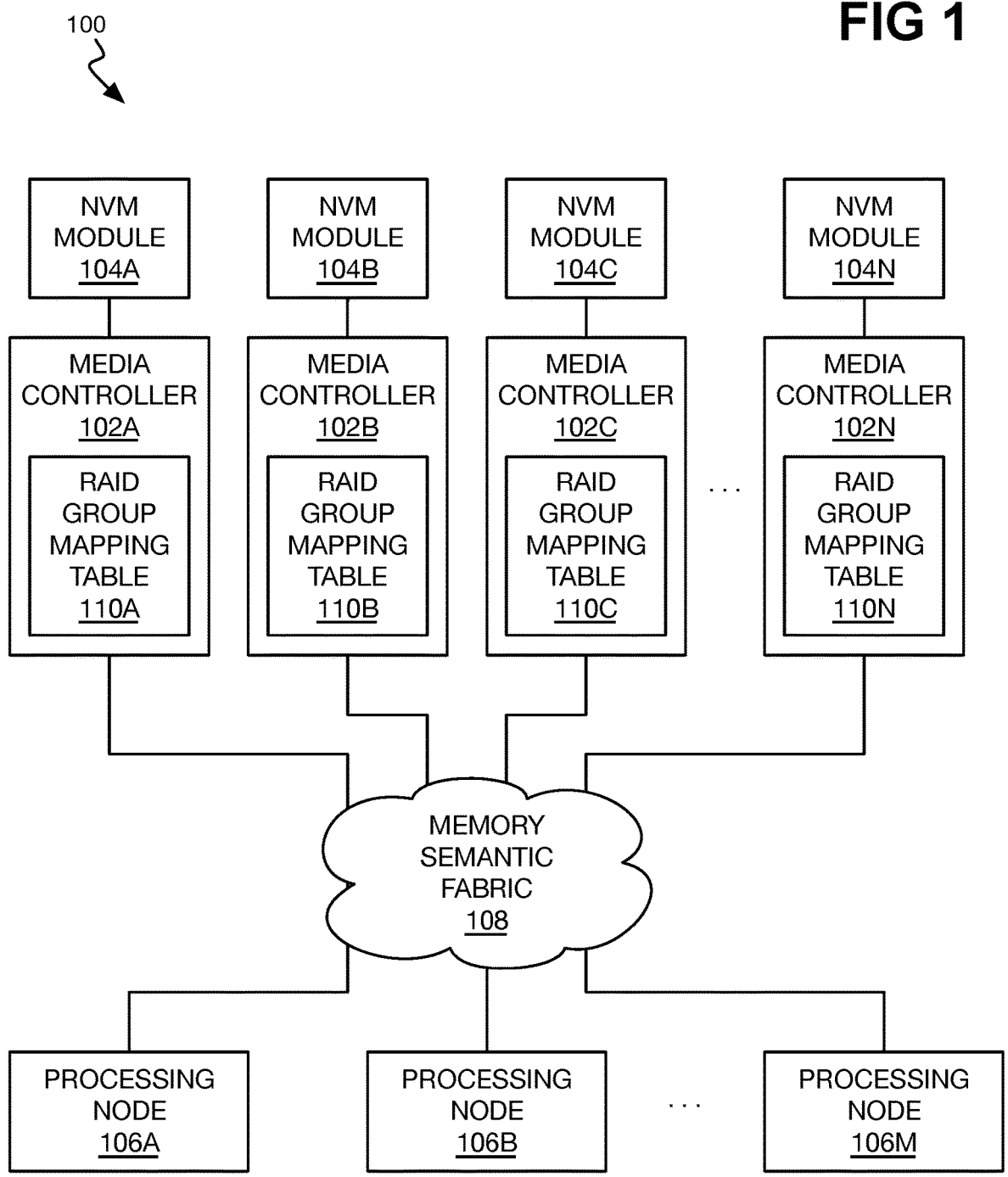
FIG. 1 is a diagram of an example storage-class memory (SCM) system having media controllers that cooperatively provide for masterless redundant array of independent disks (RAID) functionality for byte-addressable non-volatile memory (NVM) modules attached to the controllers.

As noted in the background, the storage of a computing system has historically differed from the main memory of a computing system in physical characteristics, driving the modern computing system design. For instance, block-addressable file systems have been developed to permit computing systems to persistently store data on storage like hard disk drives. By comparison, byte-addressable memory topologies have been employed to permit computing systems to quickly access data within main memory like dynamic random-access memory (DRAM).

However, the physical characteristics dividing storage from main memory have become blurred. With the advent of solid-state drives (SSDs), which employ non-volatile semiconductor memory in lieu of rotating magnetic platters, storage has become increasingly fast. Recent advances in bus design, such as the Peripheral Component Interconnect Express (PCIe) bus, have leveraged such increasing speeds, albeit while maintaining block addressability of the underlying storage.

With the advent of phase-change memory (PCM) and resistive RAM (ReRAM), main memory has become persistent. However, in other ways main memory of a computing system has remained unchanged. An on-chip or off-chip memory controller accepts memory access requests from processing cores of a processor of a computing system, and responsively accesses on or off-board main memory over a dedicated memory bus, regardless of whether the memory is DRAM, PCM, ReRAM, or another type of main memory.

A more recent advance benefiting main memory of computing systems is storage-class memory (SCM). SCM leverages the larger sizes and increasing speed of NVM within the context of main memory. That is, unlike storage and like main memory, SCM can be byte addressable. Whereas traditionally a memory controller monolithically accepts memory access requests and directly handles those requests in relation to memory modules like DRAM at the behest of requesting processing cores, the controller functionality is further disaggregated for SCM by abstracting the underlying media, such as NVM.

A memory semantic fabric can be used to interconnect processors and memory, permitting a processor to access SCM regardless of where the memory is located on the fabric. A memory semantic fabric includes an underlying high-speed input/output (I/O) network that can connect processors to the physical media implementing main memory, at potentially significantly longer distances than otherwise possible. Rather than a memory controller also having media access capability, the memory access requests that a memory controller fields from processing cores are transmitted over the fabric to media controllers particular to their attached physical media. That is, the media-specific aspects of control are moved from the memory controller to the media controller. An example standard governing such interconnection on a memory semantic fabric is Gen-Z SCM can permit larger amounts of memory to be accessed by a processor, no differently than how it already can access locally connected main memory. That is, SCM still remains byte addressable, and is not accessed as via a file system or in another way that uses block addressability. Physical chip, board, and bus constraints, which continue to worsen, can effectively be overcome.

However, SCM can introduce vulnerabilities into computing systems, particularly when SCM is used in lieu of storage as well as to implement main memory. At a memory cell level, SCM may leverage techniques, like error-correcting code (ECC) methodologies, that have been used with more traditional DRAM to prevent data corruption. However, at broader levels, redundancy is unavailable to SCM: redundancy techniques like redundant arrays of independent disks (RAID) are not readily applicable to byte addressable main memory like SCM (or DRAM). This can be because the length of time for processing a RAID transaction can be too large in the context of SCM-related transactions.

Techniques described herein provide for a way to extend RAID to SCM. Specifically, the techniques apply to byte-addressable NVM modules that can serve as main memory of a computing system. The NVM modules have corresponding media controllers that are each attached to and responsible for its corresponding NVM module. The media controllers of the NVM modules cooperatively provide RAID functionality, but at a granularity at which the NVM modules are byte addressable. Furthermore, the RAID is provided in an operating system (OS)— and indeed processor-agnostic basis; the overarching processors and OSs can even be unaware that RAID is being implemented at the underlying main memory level. RAID can be provided in a way that supports shared memory applications, ensuring consistency even when multiple processors or computing systems address the same underlying NVM modules.

FIG. 1 shows an example storage-class memory (SCM) system 100 in which masterless RAID is implemented. The system 100 includes SCM media controllers 102A, 102B, 102C, . . . , 102N, which are collectively referred to as the media controllers 102. The media controllers 102A, 102B, 102C, . . . , 102N are respectively directly physically attached to byte-addressable NVM modules 104A, 104B, 104C, . . . , 104N, which are collectively referred to as the NVM modules 104. In the example of FIG. 1, each media controller 102 has one NVM module 104 directly physically connected thereto. Each media controller 102 is responsible for the NVM modules 104 to which the media controller 102 is attached. The media controllers 102 may be physically located on their respective NVM modules 104

The system 100 includes processing nodes 106A, 106B, . . . , 106M, which are collectively referred to as the processing nodes 106. There may be fewer processing nodes 106 than media controllers 102, as in the example of FIG. 1, or there may be fewer media controllers 102 than processing nodes 106. The media controllers 102 and the processing nodes 106 are communicatively connected to one another over a memory semantic fabric 108. Each media controller 102 and each processing node 106 is directly connected to the memory semantic fabric 108. Each media controller 102 is responsible for the NVM module(s) 104 attached to the media controller 102 in question.

As SCM media controllers 102, the media controllers 102 abstract the NVM modules 104 from the processing nodes 106. Therefore, the media controllers 102, and not the processing nodes 106, each handle the specifics as to communication with the NVM modules 104 to which the controllers 104 are attached. The processing nodes 106 nevertheless can use the NVM modules 104 as their (persistent) main memory, as opposed to as storage, and indeed may not have other, local main memory.

The processing nodes 106 may each be a computing device, and can include one or more processors that each has multiple processing cores. The processing nodes 106 can include memory controllers that may be integrated within their processors or external to the processors. The processing cores of the processors of the processing nodes 106 may each have multiple caches, such as level-one (L1) and level-two (L2) caches, and share another cache, such as a level-three (L3) cache, with the other cores of the same processor.

The fabric 108 is a memory semantic fabric, such as a Gen-Z memory fabric. The memory semantic fabric 108 can include one or more SCM switches and other components that physically interconnect the media controllers 102 with the processing nodes 106. Load and store operations that the processing cores of the processors of the processing nodes 106 issue result in the memory controllers of the nodes 106 correspondingly communicating with the media controllers 102 over the memory semantic fabric 108, which satisfy the operations in relation to their attached NVM modules 104.

The media controllers 102A, 102B, 102C, . . . , 102N respectively include RAID group mapping tables 110A, 110B, 110C, . . . , 110N, which are collectively referred to as the RAID group mapping tables 110. The media controllers 102 use the RAID group mapping tables 110 to cooperatively provide RAID functionality. The media controllers 102 provide this RAID functionality at the granularity at which the NVM modules 104 are byte-addressable, without employing a master RAID controller. For instance, this granularity may be a cache line granularity at which the processing nodes 106 cache data persistently stored within the NVM modules 104, such as sixty-four bytes. The granularity may be the granularity of individual load and store operations issued by the processing nodes 106, such as eight bytes.

Figure 2:
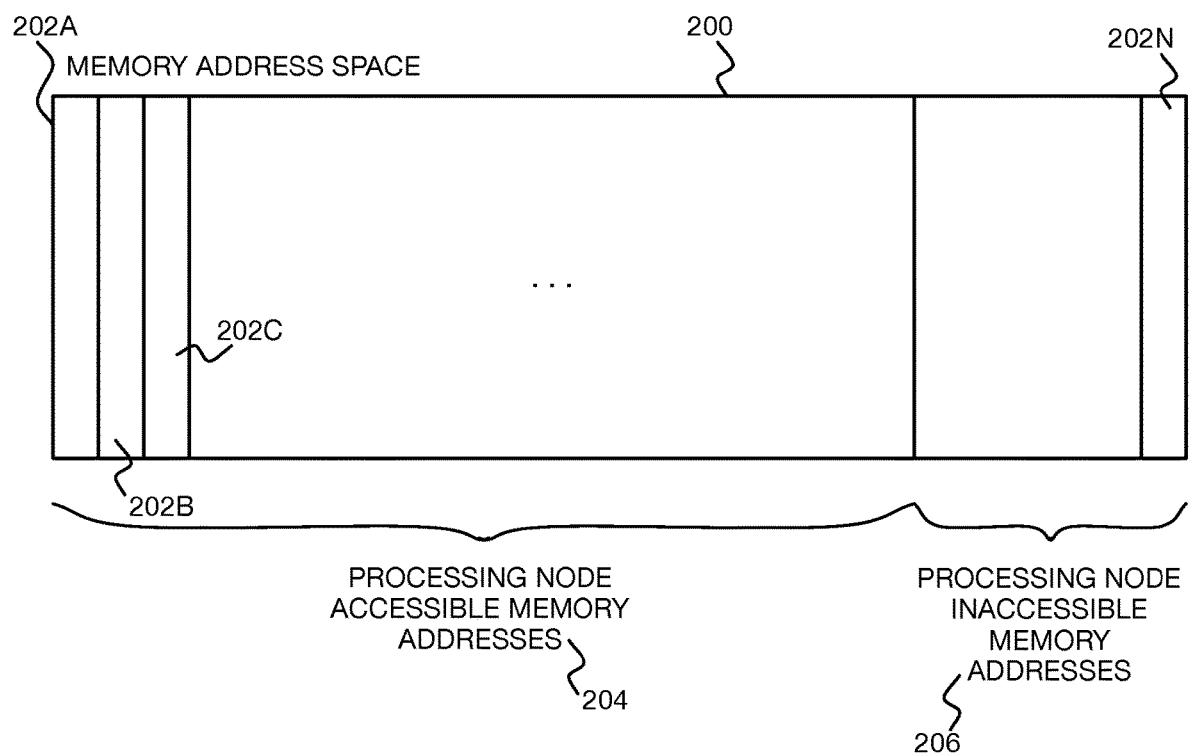
FIG. 2 is a diagram of an example memory address space that that the media controllers of FIG. 1 provide using the NVM modules attached to the controllers.

FIG. 2 shows an example memory address space 200 that the media controllers 102 provide using the NVM modules 104. The memory address space 200 includes individual memory addresses 202A, 202B, 202C, . . . , 202N, which are collectively referred to as the memory addresses 202. Each memory address 202 is assigned to a media controller 102, and each media controller 102 is thus responsible for the memory addresses 202 assigned to the controller 102.

The memory addresses 202 of the memory address space 200 include memory addresses 204 that are accessible by the processing nodes 106, and memory addresses 206 that are not accessible by the processing nodes 106. The memory addresses 204 are depicted as contiguous to the memory addresses 206 in FIG. 2 for illustrative clarity, but that may be interleaved within or otherwise discontiguous to the memory addresses 206. The media controllers 102 use the memory addresses 206 to provide redundancy for the memory addresses 204 that the processing nodes 106 can access.

The memory addresses 204 of the memory address space 200 that the processing nodes 204 thus store data accessible by the processing nodes 106 over the memory semantic fabric 108, including individually and/or on a pooled basis. (That is, some memory addresses 204 may be exclusively assigned to individual processing nodes 106, whereas other memory addresses 204 may be pooled for use by more than one processing node 106.) The memory addresses 206 of the memory address space 200 store parity for this data. The media controllers 102 can provide RAID functionality in a manner that ensures data integrity regardless of whether such assignment is on an individual or pooled basis.

Each memory address 202 assigned to a media controller 102 is part of a RAID group that can include a memory address 202 assigned to every other media controller 102. In one RAID implementation, the memory addresses 202 of a RAID group assigned to all but one media controller 102 may be memory addresses 204 that store data accessible by the processing nodes 106. In this implementation, the memory address 202 of the RAID group assigned to the remaining media controller may be a memory address 206 that stores parity for the other memory addresses 202 of the group. More generally, the memory addresses 202 of a RAID group assigned to some of the media controllers 102 store data accessible by the processing node, whereas the memory address 202 of the RAID group assigned to another media controller 102 stores parity data for this data.

Figure 3:
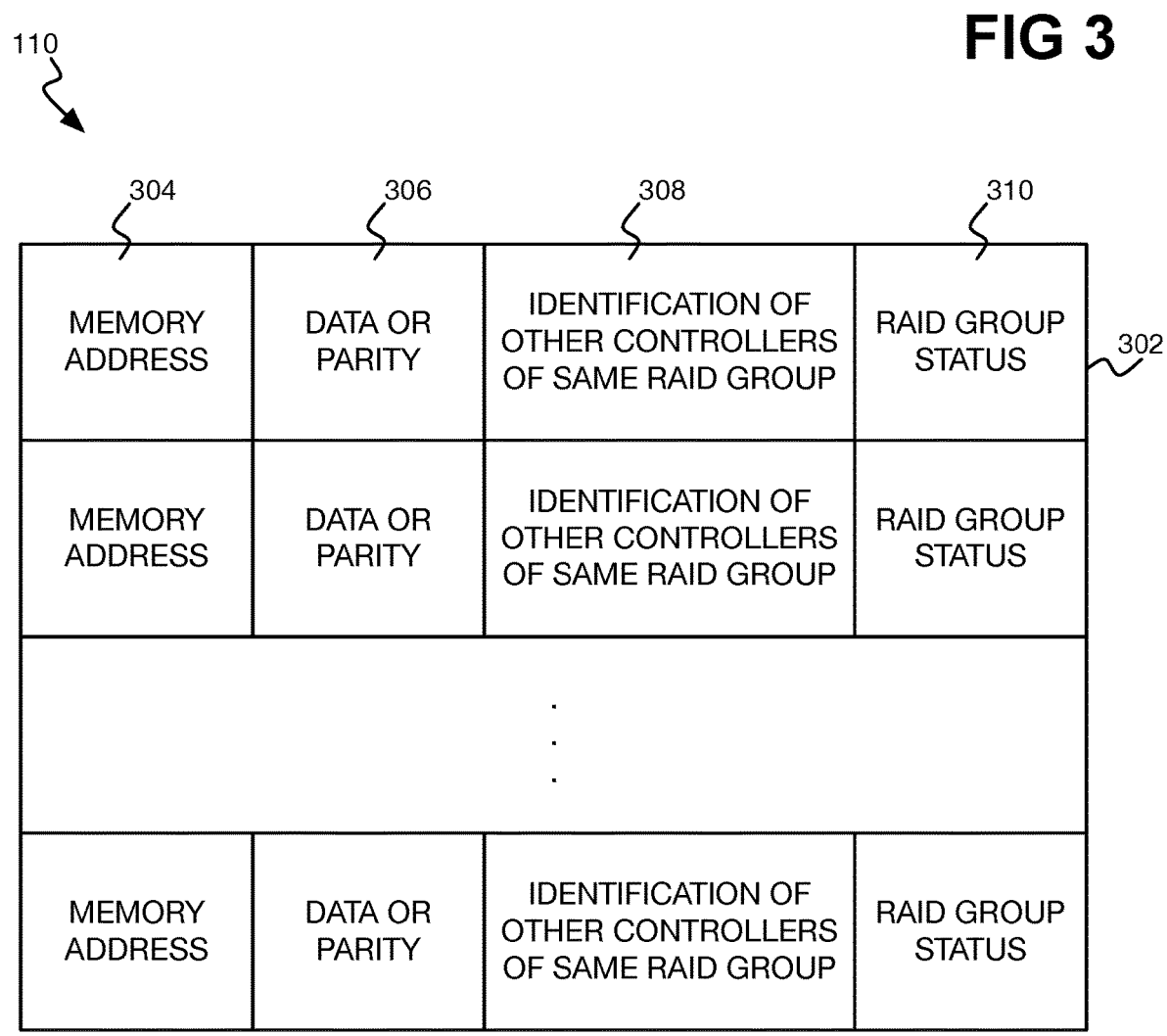
FIG. 3 is a diagram of an example RAID group mapping table that each media controller of FIG. 1 maintains.

FIG. 3 shows an example of the RAID group mapping table 110 that each media controller 102 maintains. A media controller 102 stores a table entry 302 for every memory address 202 assigned to the controller 102 in question. The table entry 304 includes a field 304 identifying the memory address 202 corresponding to the entry 304. The table entry 304 includes a field 306 indicating whether the memory address 202 stores data or parity. That is, for the memory address 202 to which a table entry 302 corresponds, the entry 304 identifies whether the memory address 202 is a memory address 204 or a memory address 206.

Each table entry 302 of the RAID group mapping table 110 maintained by a media controller 102 includes a field 308 identifying the other media controllers 102 that have also been assigned memory addresses 202 for the same RAID group as the memory address 202 to which the entry 302 corresponds. For each such media controller 102, the field 308 indicates whether the controller 102 stores data or parity. The table entry 302 includes a field 310 identifying the status of the RAID group including the memory address 202 to which the entry 302 corresponds. The status of the RAID group may be normal or degraded.

Figure 4:
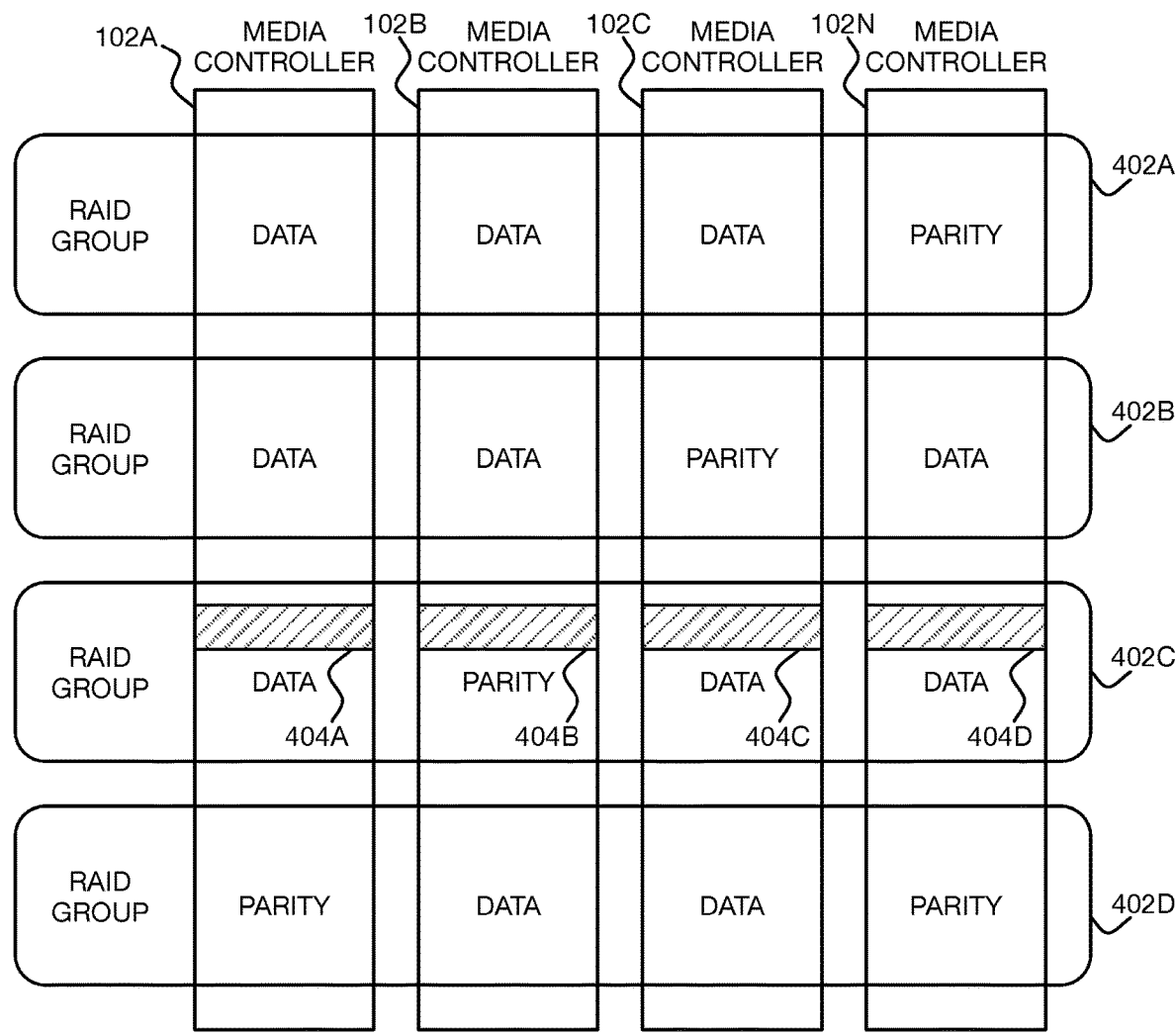
FIG. 4 is a diagram of an example as to how memory addresses can be assigned to the media controllers of FIG. 1 over RAID groups.

FIG. 4 shows an example as to how the memory addresses 202 can be assigned to the media controllers 102 over RAID groups 402A, 402B, 402C, and 402D, collectively referred to as the RAID groups 402. For each RAID group, one media controller 102 stores parity, and the other media controllers 102 store data. For example, FIG. 4 explicitly depicts four memory addresses 402A, 402B, 402C, and 402D, collectively referred to as the memory addresses 402, within the RAID group 402A, which are assigned to respective media controllers 102A, 102B, 102C, and 102N. The controllers 102A, 102B, and 102C store data at the memory addresses 402A, 402B, and 402C, respectively, whereas the controller 102N stores parity for the data at the addresses 402A, 402B, and 402C.

Figure 5A:
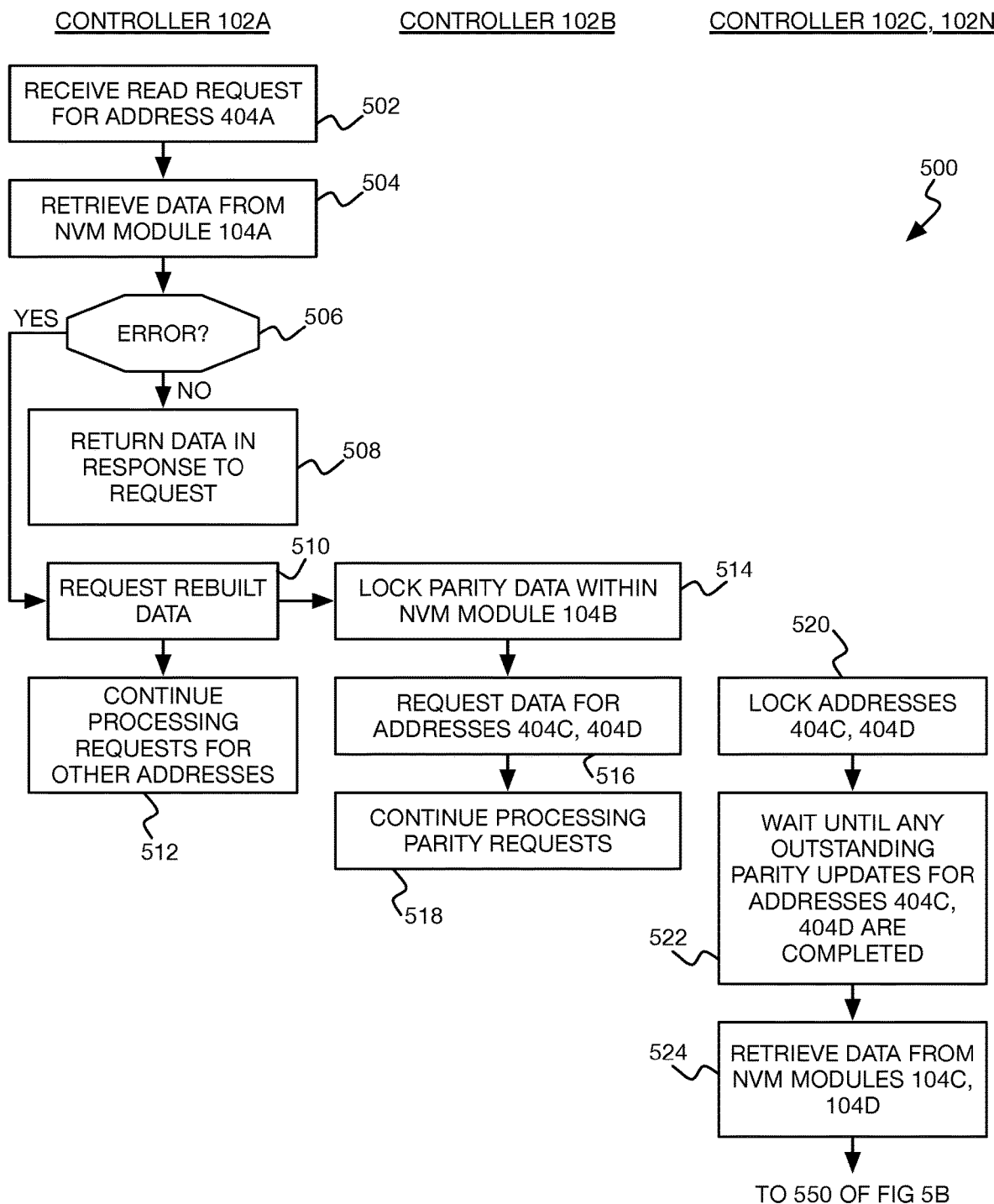
FIGS. 5A and 5B are flowcharts of an example method for performing a read request within the SCM system of FIG. 1.
Figure 5B:
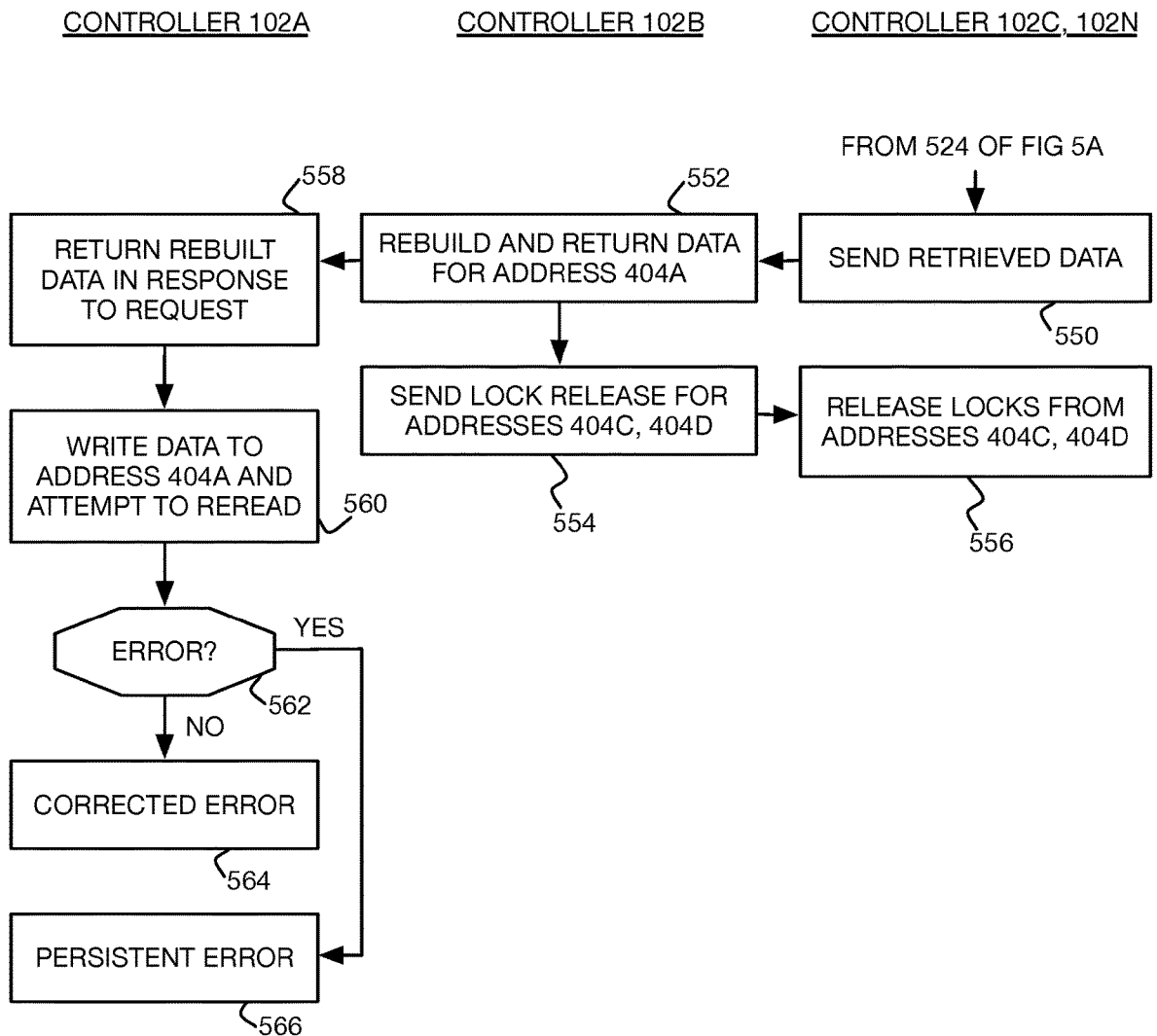

FIGS. 5A and 5B show a method 500 of example performance of a read request (i.e., a load operation) within the SCM system 100. The example of FIGS. 5A and 5B is described in relation to the media controller 102A receiving a read request for the data stored at the memory address 404A. As such, within the RAID group 402C including the memory address 404A, the media controller 102B stores parity at the memory address 404B from the data at the memory address 404A, and from the data that the media controllers 102C and 102N respectively store at the memory addresses 404C and 404D.

The parts of the method 500 are thus organized over three columns. The media controller 102A performs the parts in the left column, and the media controller 102B performs the parts in the middle column. Each of the media controllers 102C and 102N performs the parts in the right column. The media controllers 102 can each implement its corresponding parts of the method 500 by executing instructions stored on a non-transitory computer-readable data storage medium.

The media controller 102A receives a load operation (i.e., a read request) for the memory address 404A from a processing node 106 over the memory semantic fabric 108 (502). The media controller 102A retrieves the data at the memory address 404A from the NVM module 104A attached to the controller 102A (504). If the media controller 102A does not encounter any media error within the NVM module 104A while retrieving the data (506), then the controller 102A returns the successfully retrieved data back to the requesting processing node 106 over the memory semantic fabric 108 (508). Thus, when no read errors occur, the media controller 102A can respond to read requests without involving any other media controller 102.

However, if the media controller 102A encounters a media error in retrieving the data from the NVM module 104A (506), then the controller 102A will have not have successfully retrieved the data. Therefore, the media controller 102A requests, over the memory semantic fabric 108, that the media controller 102B rebuild (i.e., reconstruct) and return the requested data (510). That is, the media controller 102A can send the load operation in question to the media controller 102B, flagging the operation as a rebuild operation (i.e., an operation to rebuild the data in question from parity). The media controller 102A can inspect its RAID group mapping table 110A to identify the media controller 102B as the controller 102 storing parity at the memory address 404B that has been calculated from the data stored at the memory address 404A. After requesting the rebuilt data from the controller 102B, the controller 102A can continue to process requests for other addresses stored within the NVM module 104A while waiting for the rebuilt data for the address 404A (512).

The media controller 102B, upon receiving the request from the controller 102A, locks the parity for the address 404A (and thus also for the addresses 404C and 404D) stored at the address 404B within the NVM module 104B (514). The media controller 102B also requests that the media controllers 102C and 102N respectively return the data at the memory addresses 404C and 404D from which the parity has also been calculated (516), over the memory semantic fabric 108. The media controller 102B can inspect its RAID group mapping table 110B to identify the media controllers 102C and 102N as the controllers 102 that also store data, at the memory addresses 404C and 404D, from which the parity has been calculated. After requesting the data at the memory addresses 404C and 404D from the controllers 102C and 102N, the controller 102B can continue to process parity requests for other addresses (518).

The media controllers 102C and 102N lock the addresses 404C and 404D within the NVM modules 104C and 104N (520), so that no new data can be written to the addresses 404C and 404D until the existing data at these addresses have been retrieved. The media controllers 102C and 102N further wait until any outstanding parity updates for addresses 404C and 404D have been completed by the controller 102B (522). As will be described later in the detailed description, when the media controller 102B performs a parity update for an address, the controller 102B notifies the controller 102A that requested the parity update when the update has been completed. Each of the media controllers 102C and 102N thus delays retrieving the data at the respective memory address 404C or 404D if any write requests to the address in question are pending (i.e., which will result in the controllers 102C and 102N sending parity updates to the controller 102B), to maintain data consistency.

Once any outstanding parity updates have been completed, the media controllers 102C and 102N can respectively retrieve the data at the memory addresses 404C and 404D from the NVM modules 104C and 104N (524). The media controllers 102C and 102N return the retrieved data to the media controller 102B over the memory semantic fabric 108 (550). Upon receiving the read data at the memory addresses from the media controllers 102C and 102N, the media controller 102B rebuilds the data at the memory address 404A and returns the rebuilt data to the media controller 102A (552), over the memory semantic fabric 108. The media controller 102B rebuilds (i.e., reconstructs) the data from the parity at the memory address 404B, and from the data at each of the memory addresses 404B and 404C. For example, the media controller 102B may perform an exclusive-or (XOR) operation on the parity and the data retrieved from each of the media controllers 404B and 404C to rebuild the data at the memory address 404A.

The media controller 102A returns the received rebuilt data back to the requesting processing node 106 over the memory semantic fabric 108 (558). The media controller 102A also writes the rebuilt data to the memory address 404A at the NVM module 104A attached to the controller 102A and attempts to reread the address 404A (i.e., again attempts to retrieve the data from the address 404A) (560). If the media controller 102A does not encounter an error when rereading the data from the NVM module 104A (562), then the error that was initially encountered in part 506 can be considered a corrected error (564). The media controller 102A may report that a corrected error has occurred at the address 404A, such as to a management computing device.

However, if the media controller 102A encounters a media error when rereading the data from the NVM module 104A (562), then the controller 102A may be considered as not have successfully written the rebuilt data to the memory address 402A. The error is thus a persistent error (566), having occurred at the initial read and at the subsequent reread. The media controller may similarly report that the persistent error has occurred at the address 404A, such as to a management computing device.

Figure 6A:
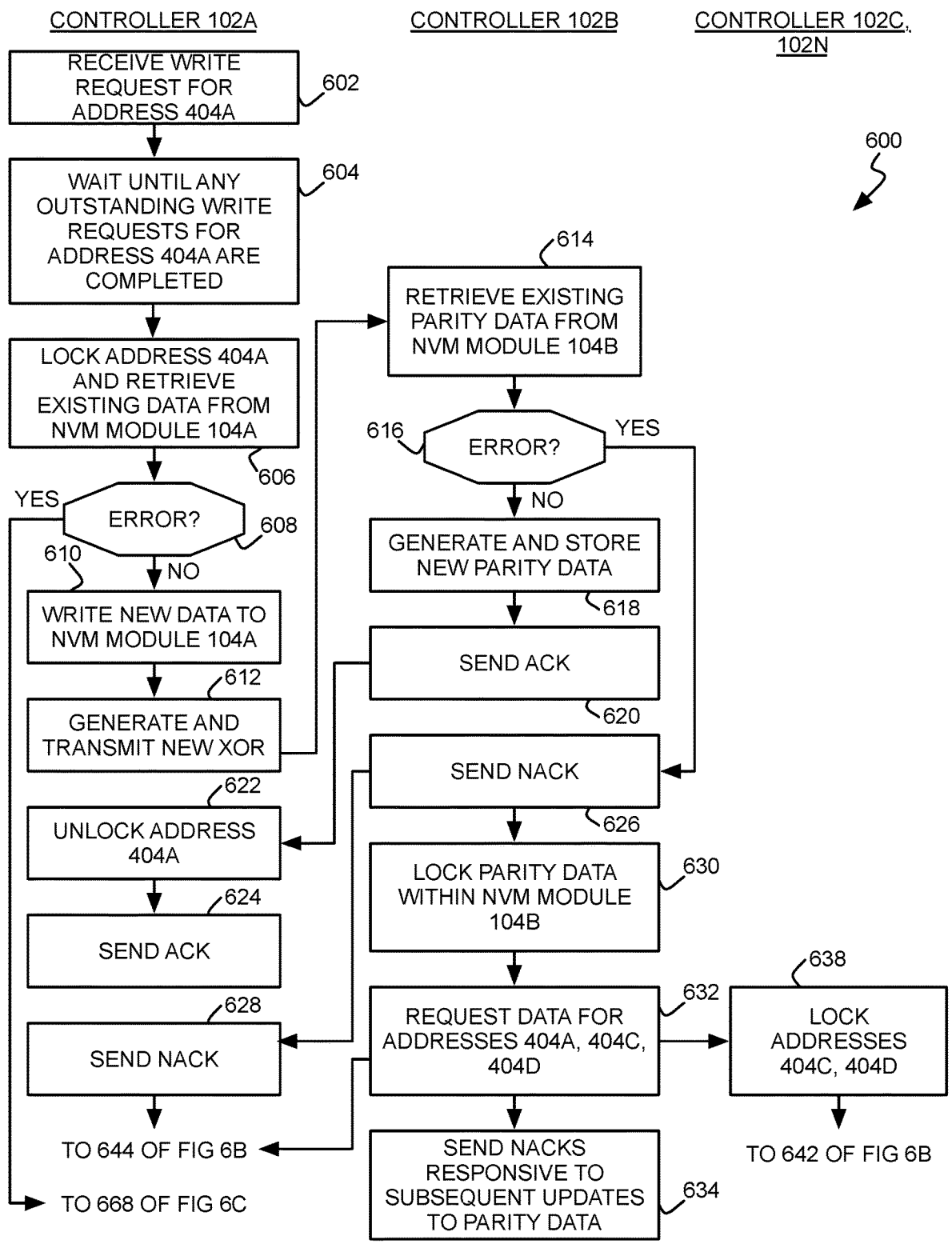

FIGS. 6A, 6B, and 6C show a method 600 of example performance of a write request (i.e., a store operation) within the SCM system 100. The method 600 described in relation to the media controller 102A receiving a write request to store new data at the memory address 404A. As such, within the RAID group 402C, including the memory address 404A, the media controller 102B stores parity at the memory address 404B from the data at the memory address 404A, and from the data that the media controllers 102C and 102N respectively store at the memory addresses 404C and 404D.

The parts of the method 600 are thus organized over three columns. The media controller 102A performs the parts in the left column, and the media controller 102B performs the parts in the middle column. Each of the media controllers 102C and 102N perform the parts in the right column. The media controllers 102 can each implement its corresponding parts of the method 600 by executing instructions stored on a non-transitory computer-readable data storage medium.

The media controller 102A receives a store operation (i.e., a write request) to store new data at the memory address 404A from a processing node 106 over the memory semantic fabric 108 (602). The controller 102A waits until any outstanding parity updates for the address 404A have been completed by the controller 102B (604). That is, if the controller 102A relatively recently performed a prior write request to the address 404A, the controller 102B may not have yet indicated that it updated the parity for the address 404A. Therefore, the controller 102A waits to process the new write request until the parity for the address 404A has been updated pursuant to the prior write request.

Once any outstanding parity updates have been completed, the media controller 102A locks the address 404A within the NVM module 104A, and attempts to retrieve existing data from the NVM module 104A (606). Locking is performed so that subsequent write requests for the address 404A remain pending until the currently received write request has been processed. If the media controller 102A does not encounter any media error within the NVM module 104A while retrieving the data (608)—which can be referred to as a write error insofar as the error occurs during the write process of the method 600—then the controller 102A writes the new data received in the write request to the memory address 404A (610). After writing the new data, the media controller 102A performs an XOR operation on the existing data retrieved in part 606 and the new data of the write request stored in the NVM module 104A in part 610, and transmits the XOR operation result, which can be referred to as a new XOR, to the media controller 102B (612).

The media controller 102B, which is responsible for maintaining parity for the RAID group 402C, responsively retrieves the parity at the memory address 404B from the NVM module 102B attached to the controller 102B (614). If the controller 102B does not encounter an error in retrieving the existing parity (616), then the controller 102B generates and stores new parity to the memory address 404B (618). For instance, the media controller 102B can perform an XOR operation on the XOR operation result transmitted by the media controller 102A in part 614 (i.e., the new XOR) and on the existing parity retrieved in part 616 (i.e., the existing XOR). The result of this XOR operation performed by the media controller 102B is the new parity.

The media controller 102B sends an acknowledgment ("ACK") indicating that the parity update process was successful to the media controller 102A (620). Upon receiving this acknowledgment, the controller 102A unlocks the address 404A so that pending and future write requests to the address can be processed (622). The controller 102A sends an acknowledgment to the processing node 106 from which the write request was received (624), indicating that the write request was successfully completed. The method 600 is then finished. It is noted that completion of the write request when no write error occurs does not involve the media controller 102A sending the new data indicated in the write request to the media controller 102B. Rather, the controller 102A may just send the XOR of this new data and the existing data stored at the memory address 404A to the controller 102B.

If the media controller 102B was unable to retrieve the existing parity for the address 404A from the NVM module 104B in part 614, however (616), the controller 102B instead sends a different acknowledgment ("NACK") indicating that the parity update process was unsuccessful to the media controller 102A (626). The controller 102A, upon receiving this acknowledgment, sends an acknowledgment to the processing node 106 from which the write request was received (628), indicating that the write request was not successfully completed. The controller 102B, after sending the acknowledgment in part 626, locks the parity for the address 404A (and thus also for the addresses 404C and 404D) stored at the address 404B within the NVM module 104B (630).

The media controller 102B also requests that the media controllers 102A, 102C, and 102N respectively return the data at the memory addresses 404A, 404C, and 404D from which the parity has been calculated (632). Upon receiving their requests, the media controllers 102C and 102N lock the addresses 404C and 404D within the NVM modules 104C and 104N (638), so that no new data can be written to the addresses 404C and 404D until the existing data have been retrieved. The media controller 102A does not have to correspondingly lock the address 404A within the NVM module 104A at this time, however, because the address 404A was already locked in part 606.

The media controllers 102C and 102N further wait until any outstanding parity updates for addresses 404C and 404D have been completed by the controller 102B (642). Each of the media controllers 102C and 102N thus delays retrieving the data at the respective memory address 404C or 404D if any write requests to the address in question are pending (i.e., which will result in the controllers 102C and 102N sending parity updates to the controller 102B), to maintain data consistency. The media controller 102A does not have to wait for any parity updates for address 404A to be completed, since the controller 102A previously waited in this regard in part 604.

The media controller 102A retrieves the existing data at the memory address 404A from the NVM module 104A (644). The media controllers 102C and 102N likewise respectively retrieve the data at the memory addresses 404C and 404D from the NVM modules 104C and 104N once any outstanding parity updates have been completed (648). The media controller 102A sends its retrieved data to the media controller 102б (646), as do the media controllers 102C and 102N (650). The controller 102б generates and stores new parity to the memory address 404B and attempts to re-read the address 404B (i.e., again attempts to retrieve the parity from the address 404B) (652). The controller 102б can perform an XOR operation on the retrieved data received from the controllers 102A, 102C, and 102N, the result of which is the new parity.

If the media controller 102б does not encounter an error when rereading the address 404B (654), the prior error in part 616 that was initially encountered can be considered a corrected error (656). The controller 102B may report that a corrected error has occurred at the address 404B, such as to a management computing device. However, if the controller 102б encounters a media error when rereading the address 404B (654), the resulting error may be considered a persistent error (658), since the error occurred both at the prior reading of the address 404B in part 614 and the subsequent reading of this address in part 652. The media controller may similarly report that the persistent error has occurred at the address 404B, such as to a management computing device.

Regardless of whether the media controller 102B was able to retrieve the parity from the memory address 404B after having newly generated this parity in part 652, the controller 102B instructs the controllers 102A, 102C, and 102N to respectively release their locks from the memory addresses 404A, 404C, and 404N (660). The controller 102A thus releases its lock from the address 404A upon receiving this instruction (662), and the controllers 102C and 102N likewise release their locks from the addresses 404C and 404D, respectively (664). The controller 102B similarly releases the lock previously placed on the parity stored at address 404B (666).

It is noted that a persistent failure of the controller 102B in being able to read the parity from the address 404B does not mean that the data stored at the addresses 404A, 404C, and 404N is presently unavailable. Rather, such a persistent failure means that the data stored at the addresses 404A, 404C, and 404N has no redundancy. Should any of the controllers 102A, 102C, and 102N be subsequently unable to respectively retrieve the data at these addresses, the data cannot be regenerated as has been described in relation to the method 500 of FIGS. 5A and 5B.

If back in part 606 the media controller 102A encountered a media error when attempting to retrieving the existing data from the NVM module 104A (608), the controller 102A sends the new data of the write request to the media controller 102B and requests that the controller 102B build new parity for the address 404A using the new data (668). The media controller 102B therefore itself has to generate the new XOR that the media controller 102A generated when there was no error. Because the new XOR is generated from existing data stored in the NVM module 104A that the media controller 102A was unable to read, the media controller 102B itself has to rebuild the existing data.

After the media controller 102A sends the new data and the new parity build request to the media controller 102B, the controller 102A writes the new data to the NVM module 104A and attempts to read the just written data (670). Because the controller 102A encountered an error when previously attempting to read the address 404A, however, the controller 102A may instead write the new data to a spare address for the address 404A within the same NVM module 104A. If the controller 102A does not encounter an error during this attempted read (672), then the prior error that was encountered in part 608 can be considered a corrected error at the address 404A (674), which may be reported to a management computing device. If the controller 102A does encounter an error during the attempted read (672), the resulting error may be considered a persistent error (676), since the error also occurred during the prior read in part 606. The persistent error may also be reported to a management computing device.

Upon receiving the new data and the new parity build request, the media controller 102B locks the parity for the address 404A within the NVM module 104B (678) (i.e., locking the address 404B at which the parity for the address 404A is stored). The controller 102B requests that the media controllers 102C and 102N respectively return the data at the memory addresses 404C and 404D (680), and continues processing parity requests received for other addresses (682). The media controllers 102C and 102N in turn respectively lock the addresses 404C and 404D (684) upon receiving the request for the data stored at these addresses.

The media controllers 102C and 102D respectively wait until any outstanding parity updates for addresses 404C and 404D are completed (686) before retrieving the data stored at their respective NVM modules 104C and 104D at these addresses (688). The controllers 102C and 102D send their retrieved data to the media controller 102б (690). The controller 102б generates and stores new parity to the memory address 404B of the NVM module 104б (692). To generate the new parity, the controller 102B can perform an XOR operation on the retrieved data received from the controllers 102C and 102N and the data of the write request received from the controller 102A.

The media controller 102B sends an acknowledgment ("ACK") to the media controller 102A indicating that the new parity build has been completed (694). Upon receiving the acknowledgment, the controller 102A releases the lock from the address 404A (i.e., the controller 102A unlocks the address 404A), and sends an acknowledgment to the processing node 106 from which the write request was received (698), indicating that the write request has been completed. The controller 102B instructs the controllers 102C and 102N to respectively release their locks from the memory addresses 404C and 404N (603), which the controllers 102C and 102N do upon receiving this instruction (605). The controller 102б likewise releases its lock on the parity for the address 404A (and for the addresses 404C and 404N (607). That is, the controller 102B releases the lock from the address 104B that was placed in part 678.

The read process of FIGS. 5A and 5B and the write process of FIGS. 6A, 6B, and 6C that have been described accounts for the scenario when a media controller 102 encounters an error when performing a data read or a data write at a memory address 404 mapped to the NVM module 104 to which the controller 102 is directly attached. Specifically, the processes relate to the media controller 102A performing a data read or a data write at the memory address 404A mapped to the NVM module 104A to which the controller 102A is directly attached. The processes by which the other media controllers 102 perform data reads or data writes at memory addresses 404 mapped to the NVM modules 104 to which the controllers 102 are respectively directly attached performed in a similar manner.

The RAID that has been described in relation to FIGS. 5A and 5B and FIGS. 6A, 6B, and 6C can accommodate failure of one NVM module 104 without loss of data. If a media controller 102 is continually encountering errors when reading from or writing to a particular NVM module 104, then the module 104 in question may have to be replaced. When such an NVM module 104 is replaced with a new NVM module 104, any data and parity stored by the replaced NVM module 104 has to be recreated and stored on the new NVM module 104.

Specifically, for each memory address 404 mapped to the new NVM module 104 that stores data, the data rebuilding process described beginning at part 514 of the method 500 is performed. The media controller 102 maintaining parity for the RAID group 402 of which the memory address 404 in question is a part rebuilds the data, and the media controller 102 to which the new NVM module 104 is directly attached stores the rebuilt data at the new NVM module 104. For each memory address 404 mapped to the new NVM module 104 that stores parity, the parity rebuilding process involves the media controller 102 directly attached to the new NVM module 104 requesting data from which the parity is generated from the other controllers 102 storing this data at their own directly attached NVM modules 104. Once the media controller 102 directly attached to the new NVM module 104 receives this data, it can generate and store the parity on the new NVM module 104.

Figure 7:
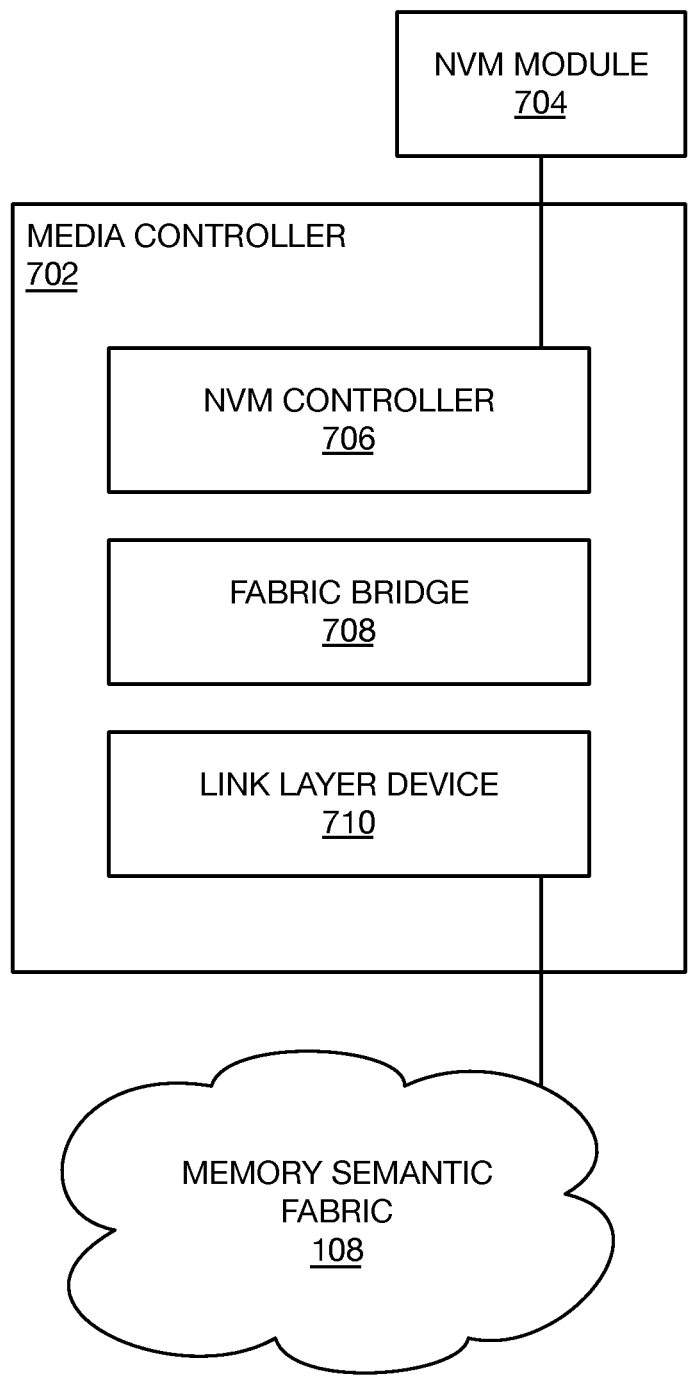
FIG. 7 is a diagram of an example media controller of the SCM system of FIG. 1.

FIG. 7 shows an example media controller 702, which can implement any of the media controllers 102 that have been described. As such, the media controller is directly attached to a NVM module 704, which can be one of the NVM modules 104 that have been describe, and is connected to a memory semantic fabric 108. The media controller 702 can be implemented completely in hardware, and is discrete from the NVM module 704 to which it is directly attached. An example of a media controller in this respect is an SCM media controller, which may be able to be attached to multiple such homogeneous or heterogeneous NVM modules 704.

The media controller 702 can include three separate hardware components: an NVM controller 706, a fabric bridge 708, and a link layer device 710. The NVM controller 706 may be particular to the type of the NVM module 704 to which the controller 706 is physically attached. The same NVM controller 706 may be able to be attached to multiple NVM modules 704 of the same type, in which case there may be a different NVM controller 706 for each kind of NVM module 704. In another implementation, an NVM controller 706 may just be able to be physically attached to one NVM module 704, in which case the number of NVM controllers 706 present dictates the maximum number of NVM modules 704 that can be physically attached to the media controller 702.

The link layer device 710 is the hardware component that connects to the memory semantic fabric 108, such as via an intervening Gen-Z switch, for the media controller 702 to communicate with other media controllers. The fabric bridge 708 interconnects the NVM controller 706 and the link layer device 710, and may be implemented as silicon-on-chip (SoC), as another hardware component, or as a combination of hardware and software. The fabric bridge 708 performs the cooperative masterless RAID functionality that has been described as it involves the media controller 702. For instance, the fabric bridge 708 can perform parts of the methods 500 and 600 that have been described, and may maintain a corresponding RAID group mapping table 110, either within the NVM module 704, or within other memory, which may be internal to the bridge 708 or the media controller 702 itself.

The techniques that have been described herein thus provide for a way to extend RAID to SCM. The RAID is masterless, in that no master RAID controller has to be involved. Rather, the media controllers that may otherwise already be present within an SCM architecture can be enhanced to achieve the cooperative distributive RAID that has been described. The RAID provides for consistency even when multiple processors or system address the same underlying NVM modules; write operations are properly sequenced when data rebuild operations are currently in process. The RAID that has been described further is OS and processor agnostic; OSs and processors mapping addresses to the memory to which the media controller govern access do not have be aware that RAID is being implemented.

We claim:

1. A system comprising:
  a memory semantic fabric, wherein the memory semantic fabric is to:
    track transactions received from a requester, and
    route the transactions to a NVM media controller;
  a plurality of byte-addressable non-volatile memory (NVM) modules; and
  the NVM media controller, wherein the NVM media controller comprises a RAID grouping mapping table and a link layer device, and the NVM media controller is to:
    connect to the memory semantic fabric via the link layer device internal to the NVM media controller, and
    connect to a fabric bridge via the link layer device internal to the NVM media controller,
    wherein the RAID grouping mapping table provides RAID functionality for the NVM media controller, and
    wherein the NVM media controller is communicatively coupled to other media controllers to cooperatively provide redundant array of independent disks (RAID) functionality at a granularity at which the NVM modules are byte-addressable without employing a master RAID controller.

2. The system of claim 1, wherein the RAID functionality is a cache line granularity at which processing nodes cache data persistently stored within the NVM modules.

3. The system of claim 1, wherein the RAID functionality comprises individual load and store operations issued by processing nodes communicatively connected to the memory semantic fabric.

4. The system of claim 1, wherein processing nodes use the NVM modules as persistent main memory.

5. The system of claim 1, wherein a memory address space comprises a plurality of memory addresses that are each assigned to a corresponding media controller,
  wherein each memory address assigned to each media controller is part of a RAID group including a memory address assigned to each other media controller module,
  and wherein the memory addresses assigned to some of the media controller of the RAID group store data accessible by processing nodes issuing load and store operations over the memory semantic fabric, and the memory address assigned to another media controller of the RAID group not storing the data accessible by the processing nodes stores parity for the data.

6. The system of claim 5, wherein each media controller maintains the RAID group mapping table storing, for each memory address assigned to the media controller:

whether the memory address stores the data accessible by the processing node issuing load and store operations or whether the memory address stores the parity for the data;

identification of the media controllers for other of the memory addresses within the RAID group, and whether the other of the memory addresses store the data accessible by the processing nodes issuing load and store operations or the parity for the data; and a status of the RAID group as normal or degraded.

7. The system of claim 5, wherein the media controller responsible for a selected memory address of the RAID group directly receives the load operations for the data stored at the selected memory address from over the memory semantic fabric, and wherein the media controller responsible for the selected memory address retrieves the data from the NVM module to which the media controller is attached and responsively returns the data, without involving other of the media controllers, when the media controller does not encounter a read error for the selected memory address.

8. The system of claim 7, wherein, when the media controller encounters the read error for the selected memory address, the media controller responsible for the selected memory address requests that the media controller responsible for the memory address of the RAID group storing the parity for the data reconstruct the data, and wherein the media controller responsible for the memory address storing the parity reconstructs the data at the selected memory address from the parity and the data stored at other of the memory addresses of the RAID group as retrieved from the media controllers responsible for the other of the memory addresses.

9. The system of claim 5, wherein the media controller responsible for a selected memory address of the RAID group directly receives the store operations to write new data at the selected memory address from over the memory semantic fabric, wherein the media controller responsible for the selected memory address, when not encountering an error, retrieves existing data stored at the selected memory address from the NVM module to which the media controller is attached, writes the new data to the NVM module, and sends an exclusive-or (XOR) operation result of the existing data and the new data to the media controller responsible for the memory address of the RAID group storing the parity, and wherein the media controller responsible for the memory address storing the parity responsively updates the parity using the XOR operation result, without involving other of the media controllers.

10. The system of claim 9, wherein, the media controller responsible for the selected memory address, when encountering the error, sends the new data to the media controller responsible for the memory address of the RAID group storing the parity, and wherein the media controller responsible for the memory address storing the parity responsively updates the parity from the new data and from the data stored at other of the memory addresses of the RAID group as retrieved from the media controllers responsible for the other of the memory addresses.

11. A media controller comprising:

a non-volatile memory (NVM) controller to attach to a selected byte-addressable NVM module of a plurality of byte-addressable NVMs;

a link layer device to communicatively connect to a memory semantic fabric to which other media controllers are physically attached to other byte-addressable NVMs of the plurality of byte-addressable NVMs, wherein the memory semantic fabric is to:

track transactions received from a requester, and route the transactions to a NVM media controller; and a fabric bridge, wherein the NVM media controller directly receives store operations to write new data stored at the selected memory address over the memory semantic fabric, wherein, when the fabric bridge does not encounter an error for the selected memory address, the fabric bridge retrieves existing data stored at the selected memory address from the NVM module, writes the new data to the NVM module, and sends an exclusive-or (XOR) operation result of the existing data and the new data to the other media controller for the other NVM module storing parity for the existing data, wherein, when the fabric bridge encounters the error, the fabric bridge sends the new data to the other media controller for the other NVM module storing the parity for the existing data, wherein the NVM media controller comprises a RAID grouping mapping table and a link layer device, and the NVM media controller is to:

connect to the memory semantic fabric via the link layer device internal to the NVM media controller, and connect to the fabric bridge via the link layer device internal to the NVM media controller, wherein the RAID grouping mapping table provides RAID functionality for the NVM media controller, and wherein the NVM media controller is communicatively coupled to other media controllers to cooperatively provide redundant array of independent disks (RAID) functionality at a granularity at which the NVM modules are byte-addressable without employing a master RAID controller.

12. The media controller of claim 11, wherein for a second selected memory address assigned to the memory controller, the media controller directly receives load operations for data stored at the second selected memory address from over the memory semantic fabric, wherein, when the fabric bridge does not encounter a read error for the second selected memory address, the fabric bridge retrieves the data from the NVM module and responsively returns the data over the memory semantic fabric, without involving the other media controllers, and wherein, when the fabric bridge encounters the read error, the fabric bridge requests that the other media controller for the other NVM module storing parity for the data reconstruct the data.

13. The media controller of claim 11, wherein for a second selected memory address assigned to the media controller, the media controller receives a request to reconstruct data for a different memory address from the other media controller responsible for storing the data at the different memory address and that encountered a read error for the different memory address, and wherein, the fabric bridge retrieves at the second selected memory address of the second selected byte-addressable NVM module parity for the data, retrieves different data stored at the other NVM modules not storing the parity for the data, and reconstructs the data from the parity and the different data.

14. The media controller of claim 11, wherein for a second selected memory address assigned to the media controller is provided by the fabric bridge, the media controller receives new data for a different memory address from the other media controller responsible for storing the new data at the different memory address and that encountered an error for the different memory address, and
wherein, the fabric bridge responsively updates parity at the second selected memory address of the selected byte-addressable NVM module from the new data and from existing data, including reconstructing the existing data from the parity and different data stored at the other NVM modules not storing the parity.

15. A media controller comprising:
a non-volatile memory (NVM) controller to attach to a selected byte-addressable NVM module of a plurality of byte-addressable NVMs;
a link layer device to communicatively connect to a memory semantic fabric to which other media controllers are physically attached to other byte-addressable NVMs of the plurality of byte-addressable NVMs, wherein the memory semantic fabric is to:
track transactions received from a requester, and
route the transactions to the media controller; and
a fabric bridge, wherein for a selected memory address assigned to the NVM controller, the media controller directly receives load operations for data stored at the selected memory address from over the memory semantic fabric,
wherein, when the fabric bridge does not encounter a read error for the selected memory address, the fabric bridge retrieves the data from the NVM module and responsively returns the data over the memory semantic fabric, without involving the other media controllers,
wherein, when the fabric bridge encounters the read error, the fabric bridge requests that the other media controller for the other NVM module storing parity for the data reconstruct the data,
wherein the NVM controller comprises a RAID grouping mapping table and a link layer device, and wherein the RAID grouping mapping table provides RAID functionality for the NVM controller, and the NVM controller is to:
connect to the memory semantic fabric via the link layer device internal to the NVM controller, and
connect to the fabric bridge via the link layer device internal to the NVM controller, wherein the RAID grouping mapping table provides RAID functionality for the NVM controller, and
wherein the NVM controller is communicatively coupled to other media controllers to cooperatively provide redundant array of independent disks (RAID) functionality at a granularity at which the NVMs are byte-addressable without employing a master RAID controller.

16. A method comprising:
receiving from over a memory semantic fabric, by a non-volatile memory (NVM) media controller for a non-volatile memory (NVM) module of a plurality of byte-addressable NVMs including other NVMs, a load operation for data stored at a selected memory address, the NVM media controller cooperatively providing, with other media controllers for the other NVMs, redundant array of independent disks (RAID) functionality at a granularity at which the NVMs are byte-addressable,
wherein the memory semantic fabric is to:
track transactions received from a requester, and
route the transactions to the NVM media controller,
wherein the NVM media controller comprises a RAID grouping mapping table and a link layer device, and the NVM media controller is to:
connect to the memory semantic fabric via the link layer device internal to the NVM media controller, and
connect to a fabric bridge via the link layer device internal to the NVM media controller,
wherein the RAID grouping mapping table provides RAID functionality for the NVM media controller;
when the NVM media controller does not encounter a read error for the selected memory address:
retrieving, by the NVM media controller, the data from the NVM module; and
responsively returning, by the NVM media controller, the data over the memory semantic fabric, without involving the other media controllers;
receiving from over the memory semantic fabric, a store operation to write new data at the selected memory address; and
when the NVM media controller does not encounter an error for the selected memory address:
retrieving, by the NVM media controller, the data from the NVM module;
writing, by the NVM media controller, the new data to the NVM module;
performing, by the NVM media controller, an exclusive-or (XOR) operation on the data and the new data; and
sending, by the NVM media controller, a result of the XOR operation to the other media controller for the other NVM module storing parity for the data.

17. The method of claim 16, further comprising:
when the NVM media controller encounters the read error:
requesting, by the NVM media controller, the other media controller for the other NVM module storing the parity for the data to reconstruct the data;
receiving, by the NVM media controller, the data as reconstructed by the other media controller for the other NVM module storing the parity for the data; and
responsively returning, by the NVM media controller, the received reconstructed data over the memory semantic fabric.

18. The method of claim 16, further comprising:
when the NVM media controller encounters the error:
sending, by the NVM media controller, the new data to the other media controller for the other NVM module storing the parity for the data.

19. The method of claim 16, wherein the selected memory address is a first selected memory address, and the method further comprises:
receiving, by the NVM media controller, a request to reconstruct data for a different memory address from the other media controller responsible for storing data at the different memory address and that encountered the read error for the different memory address;
retrieving, by the NVM media controller from the NVM module, parity for the data at a second selected memory address;

retrieving, by the NVM media controller from the other media controllers for the other NVM modules not storing the parity, different data;

reconstructing, by the NVM media controller, the data at the different memory address from the parity for the data and from the different data; and returning, by the NVM media controller to the other media controller responsible for storing the data at the different memory address, the reconstructed data.

20. The method of claim 16, wherein the selected memory address is a first selected memory address, and the method further comprises:

receiving, by the NVM media controller, new data for a different memory address from the other media controller responsible for storing data at the different memory address and that encountered the error for the different memory address;

retrieving, by the NVM media controller from the NVM module, parity for the data at a second selected memory address;

retrieving, by the NVM media controller from the other media controllers for the other NVM modules not storing the parity, different data; and updating, by the NVM media controller, the parity at the second selected memory address from the different data and from the new data.

* * * * *